United States Patent
Vogt et al.

(10) Patent No.: US 10,175,128 B2
(45) Date of Patent: Jan. 8, 2019

(54) MEASURING VIAL SEAL FORCES

(71) Applicant: Hoffmann-La Roche Inc., Little Falls, NJ (US)

(72) Inventors: Martin Vogt, Allschwil (CH); Jean-Pierre Büttiker, Witterswil (CH); Roman Mathäs, Basel (CH); Holger Röhl, Allschwil (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 48 days.

(21) Appl. No.: 15/531,903

(22) PCT Filed: Dec. 17, 2015

(86) PCT No.: PCT/EP2015/080343
§ 371 (c)(1),
(2) Date: May 31, 2017

(87) PCT Pub. No.: WO2016/097210
PCT Pub. Date: Jun. 23, 2016

(65) Prior Publication Data
US 2017/0268945 A1  Sep. 21, 2017

(30) Foreign Application Priority Data
Dec. 18, 2014 (EP) .................................. 14198707

(51) Int. Cl.
*G01L 1/16* (2006.01)
*G01L 5/08* (2006.01)
*G01L 5/00* (2006.01)

(52) U.S. Cl.
CPC ................ *G01L 5/008* (2013.01); *G01L 1/16* (2013.01)

(58) Field of Classification Search
CPC ....................................................... G01L 1/16
(Continued)

(56) References Cited

U.S. PATENT DOCUMENTS 4,213,329 A 7/1980 Hayward et al.
4,511,044 A * 4/1985 Connor ................. B07C 5/3404
209/522
(Continued)

FOREIGN PATENT DOCUMENTS

WO 03/031944 4/2003

OTHER PUBLICATIONS

International Search Report and Written Opinion, issued in PCT/EP2015/080343, dated Mar. 21, 2016.

*Primary Examiner* — Max Noori
*Assistant Examiner* — Jamel Williams
(74) *Attorney, Agent, or Firm* — Medler Ferro Woodhouse & Mills PLLC (57) ABSTRACT

The invention deals with a measuring apparatus (1) comprising a body (11) with an interior (114) and an opening for accessing the interior (114) from outside the body (11), a rigid plunger (12) having an edge (1212) being identically shaped as an edge of a opening of a target vial, and a force sensor (13). The rigid plunger (12) extends though the opening of the body (11) into the interior (114) of the body (11). The edge (1212) of the rigid plunger (12) is arranged outside the body (11). The force sensor (13) is arranged in the interior (114) of the body (11). The rigid plunger (12) is movable relative to the body (11) and is coupled to the force sensor (13). The apparatus (1) can be used for measuring a force acting on the edge of the opening of the target vial for optimizing the adjustment of a vial closure facility.

16 Claims, 3 Drawing Sheets

(58) Field of Classification Search
USPC .................................................. 73/862.381
See application file for complete search history.

(56) References Cited

U.S. PATENT DOCUMENTS

| | | | |
|---|---|---|---|
| 6,446,510 B1 | 9/2002 | Kurtz et al. | |
| 6,769,308 B1* | 8/2004 | Pitzer | B60C 23/0408 |
| | | | 73/700 |
| 7,149,635 B2* | 12/2006 | Cosentino | B65B 51/10 |
| | | | 702/33 |

* cited by examiner

MEASURING VIAL SEAL FORCES

TECHNICAL FIELD

The present invention relates to a measuring apparatus for measuring a force acting on an edge of an opening of a container such as a vial.

More particularly, the invention relates to a method of adjusting a machine for closing a vial by fixing a rubber stopper on an edge of an opening of the vial. Thereby, fixing the rubber stopper on the edge of the opening of the vial comprises the steps of: (i) pushing the rubber stopper on the edge of the opening of the vial, (ii) placing a cap onto the rubber stopper and (iii) crimping the cap around the rubber stopper and the edge of the opening of the vial.

BACKGROUND ART

Pharmaceutical products or medications are provided in various different forms including liquids, powders, pills and capsules for application. For example, many pharmaceutical products are applied to patients in liquid form by oral administration or injection. The pharmaceutical product usually is provided in a primary package which directly encases the pharmaceutical product. Examples of primary packages are blisters packages, pre-filled syringes, bags and vials.

In connection with primary packaging pharmaceutical products it often is of high importance that certain conditions specific for the pharmaceutical product can be fulfilled. Typically, pharmaceutical products are primary packaged in a sterile manner in order to prevent contamination and degeneration. The primary package including the pharmaceutical product then usually is further packaged, e.g. in carton boxes, for being conveniently transported, sold and the like.

As mentioned, common primary packages include vials and other containers such as syringes, infusion bags and cartridges. Vials typically have a hollow body in which the pharmaceutical product is arranged. The body comprises a neck with an open end which is surrounded by a flange-like edge. For closing vials, often an elastic rubber stopper is placed on the edge of the opening and held by a cap crimped around the rubber stopper and the edge of the body.

In order that the opening of the vial is sealed the rubber stopper has to be tightly arranged on the edge of the opening. For that purpose, it usually is pressed onto the edge such that it is slightly deformed. It is held in a pressed fashion by the cap which typically is made of plastic or metal.

On an industrial level packaging machines are commonly used for primary packaging pharmaceutical products in vials. Thereby, such machines often pneumatically press the rubber stopper together with the cap onto the edge. In this situation the cap is crimped around the rubber stopper and the edge such that a residual force can be held by the cap. Such residual force ensures that the stopper is still pressed on the edge after the vial has left the packaging machine.

Within such packaging processes it is important that the pressure or force applied during and after primary packaging is properly adjusted. On one hand it has to be prevented that when pressing the rubber stopper on the edge of the vial the force is too high such that the edge or the stopper is damaged. On the other hand it has to made sure that after primary packaging the residual force acting from the plunger to the edge is high enough such that the opening is tightly closed in a seal fashion.

For such adjustment modern packaging machines provide information about the pressure or force pneumatically applied, e.g. by a pneumatical cylinder acting on the cap and the stopper placed on the vial. However, for precisely determining the situation such information is not sufficient. For example, the process of crimping the cap applies pressure on the cap and the rubber stopper in addition to the pressure applied by the pneumatical cylinder. However, such additional pressure is not contained in the mentioned information. In consequence, the sum of the pneumatical and crimp pressures can result in a force damaging the stopper, e.g. such that it yields into the opening and the neck of the vial. Or as another example, the rubber stoppers can have different shapes and dimensions such that the pressure applied on the outside of the stopper does not allow for concluding on the force being in fact applied to the edge of the vial.

Therefore, there is a need for a device and a method allowing for gathering information about the conditions of a rubber stopper placed on a edge of an opening of a vial or a similar container for closing the vial or similar container in a precise and predefinable manner.

DISCLOSURE OF THE INVENTION

According to the invention this need is fulfilled by an apparatus as it is defined by the features of independent claim 1 and by a method as it is defined by the features of independent claim 14. Preferred embodiments are subject of the dependent claims.

In particular, in one embodiment, the invention is a measuring apparatus for measuring a force acting on an edge of an opening of a target vial. The apparatus has a body with an interior and an opening for accessing the interior from outside the body. Further, it comprises a rigid plunger having an edge being equivalently or identically shaped as the edge of the opening of the target vial and a force sensor. The rigid plunger extends though the opening of the body into the interior of the body. The edge of the rigid plunger is arranged outside the body. The force sensor is arranged in the interior of the body. The rigid plunger is movable relative to the body and coupled to the force sensor. Thus, in the arrangement according to the invention a force acting on the edge of the rigid plunger can be transferred to the force sensor which in turn can provide a signal representative for the force applied. The apparatus can be made of a metallic material such as stainless steel, or aluminium or of a plastic material.

The term "vial" as used herein can relate to vials in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene.

Whereas the invention is directed to measuring a force acting on an edge of an opening of a vial, i.e. the target vial, the present disclosure also comprises embodiments in which other containers such as syringes, infusion bags or cartridges are involved. In particular, the measuring apparatus according to the invention and its preferred embodiments can also be embodied for measuring a force acting on an edge of an opening of a target syringe, a target infusion bag or a target cartridge. Thus, the measuring apparatus is analogously applicable for target vials as well as for target syringes, target infusion bags and target cartridges.

The term "equivalently shaped" as used in connection with the edge of the rigid plunger and the edge of the opening of the target vial can relate to a form of the respective parts being essentially the same. In particular the aspects or portions of the target vial which are in contact with a rubber stopper for closing the target vial can be as identical in shape as possible or feasible.

The apparatus according to the invention can be applied in a packaging machine or facility without requiring adaptation of the packaging machine or facility or parts thereof. Like this, the apparatus allows for efficiently evaluating the conditions of a packaging process within the machine or facility identical or very close to the real conditions present in the target vial. Thus, gathering respective pressure and force information in a precise manner can be achieved. With this information the packaging process can be adjusted such that a optimization of the closing of the target vial is efficiently possible.

Furthermore, by means of the measuring apparatus according to the invention the force applied to the edge within a packaging process can be continuously measured directly at the contacting area between the stopper and the edge. This allows for evaluating the forces at the spot where it is important for concluding on closing conditions of the vial over time. A conversion of the measurements to the situation where the stopper in fact is involved can be prevented. Thus, the force can be precisely measured all over the packaging process which allows for exactly predefining the respective situation in the target vial by adjusting the packaging machine or facility.

Preferably, the rigid plunger is linearly movable relative to the body. The term "linearly movable" in this context can relate to a movement along a straight axis. For example, the rigid plunger can be movable along a longitudinal axis of the body and/or the plunger. Such a linear movability allows for efficiently transferring the force or pressure from the edge of the rigid plunger to the force sensor.

With regard to movability of the rigid plunger in relation to the body, it can be beneficial if friction between the rigid plunger and the body is comparably low. Such a low friction can allow for drawing a conclusion from the force signal measured by the force sensor directly to the force applied on the edge of the rigid plunger. In such an embodiment, correction of the signal or measured force can be prevented.

The apparatus preferably has a height being essentially identical to a height of the target vial. Such an apparatus allows for being processed in a common packaging machine or packaging facility without requiring any adjustments to the parts of the machine or facility being involved in applying the rubber stopper and the cap on the vial or apparatus. This allows, for precisely evaluation a real live situation of the packaging process and for optimizing the parameters involved.

Preferably, the body and the rigid plunger have an outer shape which is essentially identical to the outer shape of the target vial for being applicable in common packaging machines or packaging facilities. The term "essentially identical outer shape" in this context can particularly relate to those portions of the target vial being essential for the respective packaging machine or facility. For example, the packaging machine can have a seat for placing and holding a vial in order to be processed. The seat, for example, is embodied to encase a bottom and a lower section of the body of the target vial. For such a machine a bottom and a lower section of the measuring apparatus can be identically formed as the bottom and the lower section of the vial such that the apparatus can be identically processed by the machine as the vial.

The force sensor of the measuring apparatus can have any suitable measuring means such as a pneumatic element or the like. Preferably, it comprises a piezoelectric element. Such a piezoelectric element can have a ring shaped portion being dimensioned to be arranged in the interior of the body which has an essentially cylindrical form. It can particularly be a piezoelectric quartz.

The measuring apparatus preferably comprises a signal interpretation unit for evaluating a signal generated by the force sensor wherein the signal interpretation unit is arranged outside the body and connected to the force sensor. The signal interpretation box can be connected to the force sensor by means of a wire. For accessing the force sensor, the body of the apparatus can be provided with an aperture in a wall adjacent to the interior of the body. Such a signal interpretation unit allows for gathering the signal and/or transferring it to a particular parameter or unit.

Thereby, the force sensor preferably has a wireless communication transmitter for transmitting the signal to the signal interpretation unit and the signal interpretation unit has a wireless communication receiver for receiving the signal from the force sensor. Such arrangement allows for wireless communication between the force sensor and the signal interpretation unit. Wireless communication can be advantageous, e.g., with regard to convenience of installation, further processing or the like. In such an arrangement, the body of the measuring apparatus can be made of a material not disturbing radiocommunication, such as of a plastic material.

The measuring apparatus can comprise a rubber stopper being arrangeable on the edge of the rigid plunger. Such a stopper can be embodied as the needs are for the particular target vial. Typically, rubber stoppers are elastically deformable and made of a plastic material such as butyl or similar. Thereby, the measuring apparatus can also comprise a cap being arrangeable on the rubber stopper and the edge of the rigid plunger when the rubber stopper is arranged on the edge of the rigid plunger. Since the cap is made of a metal or plastic it can be plastically deformable. Like this, it can hold the rubber stopper in a pressurized form such that a force is acting on the edge.

Preferably, the rigid plunger has a head piece comprising the edge and a piston portion extending through the opening of the body into the interior of the body. Such a rigid plunger allows for embodying the edge independently from any prerequisites of a pressure transfer to the force sensor. Like this, the rigid plunger can be sophisticatedly and efficiently shaped.

Preferably, the body has a neck with a bore ending in the opening on one side and in the interior on the other side, and a flange formed around the opening and projecting over the neck. The term "projecting over the neck" with respect to the flange of the body or the head piece of the rigid plunger can particularly relate to a lateral or radial extension of the respective parts being larger than a lateral or radial extension of the neck. The neck can, e.g., be shaped corresponding to a neck of the target vial.

Thereby, the head piece of the rigid plunger preferably projects over the neck of the body and neighbours the flange of the body, and the piston portion of the head piece pf the rigid plunger preferably extends to the bore of the neck of the body to the interior of the body. In particular, the piston portion can extend all through or partially through the bore of the neck. Thus, it can extend into the interior of the body or end in the neck of the body. This allows for efficiently transferring the force from the edge to the force sensor.

Thereby, the rigid plunger preferably comprises a coupling piece with a piston connector and a flange-like sensor connector opposite to the piston connector, wherein the coupling piece is separable from the head piece. The piston connector of the coupling piece can be formed to be connected to the piston portion of the head piece. The sensor connector of the coupling piece can project over the neck of the body. The sensor connector can contact the force sensor in the interior of the body.

Preferably, the body has an upper part and a base part, wherein the opening of the body is arranged in the upper part, the lower part is shaped to be placed on a plane surface, and the upper part is separable from the base part. Such a two part body can allow for easily accessing its interior. This can be beneficial for handling the force sensor.

Thereby, the upper part of the body and the base part of the body preferably have a thread and a male portion together forming a screw joint. Such a screw joint allows for firmly connecting and comfortably separating the two parts of the body.

In another embodiment, the invention is a method of adjusting a machine for closing a vial by fixing a rubber stopper on an edge of an opening of the vial. Such fixing of the rubber stopper by the machine involves pushing the rubber stopper on the edge of the opening of the vial, placing a cap onto the rubber stopper and crimping the cap around the rubber stopper and the edge of the opening of the vial. Thereby, the cap can be made of a plastically deformable material such as a metal or a plastic. The method comprises the steps of: placing a measuring apparatus according to any one of the preceding claims in the machine instead of the vial; starting to obtain a signal provided by a force sensor of the measuring apparatus; operating the machine to fix a rubber stopper on an edge of the measuring apparatus; observing the signal of the force sensor of the apparatus during operation of the machine; evaluating the observed signal; and adjusting the machine in accordance with the evaluated signal.

Such a method allows for evaluating the signal provided by the measuring apparatus according to the invention for adjusting the machine. This allows for considering real-live force conditions at the contact area between the edge and the rubber stopper when adjusting the machine. Like this, vials or similar containers can be precisely and predefinably closed or sealed.

Preferably, the method further comprises predefining a maximum force and a minimum force. Thereby, the machine preferably is adjusted such that a force measured by the measuring apparatus when being operated by the machine does not exceed the maximum force, and such that a residual force measured by the measuring apparatus after being operated by the machine is not below the minimum force.

Preferably, the method comprises observing the signal of the force sensor of the apparatus after operation of the machine and evaluating the observed signal. Like this, the force can be measured and observed after the packaging process. Such measuring can involve removing the measuring apparatus from the machine and still observing the measured signals.

Like this, it is possible to study stability of the closure over a comparably long period of time such as, e.g. over a month. For example, changes of the force acting on the edge can be observed over time which, e.g., allows for identifying pressure loss to an extent which can be critical for ensuring seal closing.

The aspects of the invention mentioned hereinbefore and other aspects will be apparent from and elucidated with reference to the embodiments described hereinafter.

BRIEF DESCRIPTION OF THE DRAWINGS

The measuring apparatus and method according to the invention are described in more detail hereinbelow by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes includes various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
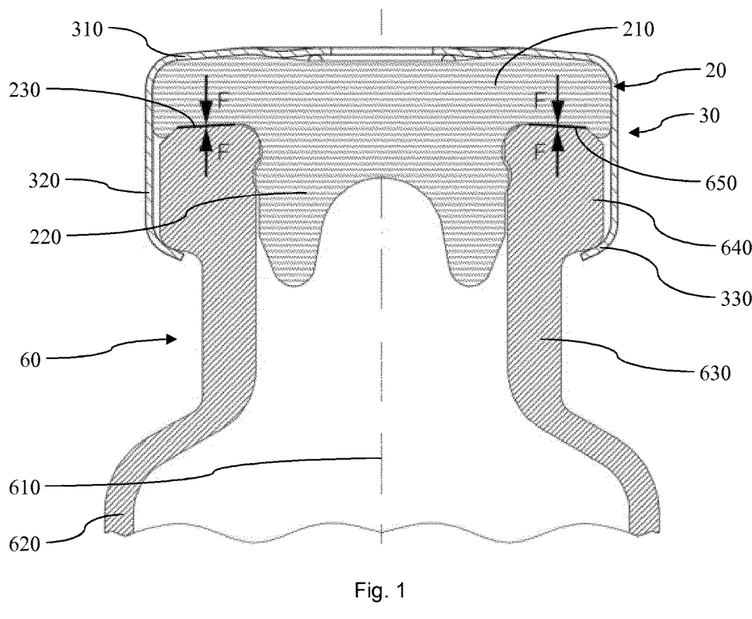
FIG. 1 shows a partial cross-sectional view of a target vial being closed by a rubber stopper which is fixed by a cap.

FIG. 1 shows a portion of a target glass vial 60 closed by a rubber stopper 20 which is fixed on the vial 60 by means of a cap 30. The vial 60 has a vertically extending longitudinal axis 610 around which the vial 60 is rotationally symmetric. It comprises a hollow containment section 620 in which a pharmaceutical product is filled. On its top end the containment section 620 passes over into a neck 630 via a shoulder. The neck 630 has a smaller diameter than the containment section 620. On its top end the neck 630 passes over into a flange-like edge 640 of the vial 60. The neck 630 and the edge 640 have a central opening through which the interior of the containment section 620 is accessible from outside the vial 60. The top surface of the edge 640 defines a stopper contact area 650.

In the cross-sectional view of FIG. 1 the rubber stopper 20 is essentially T-shaped. Thereby, it has a head section 210 and a stem section 220. The head section 210 laterally extends over the stem section 220 and abuts the top surface of the edge 640 of the vial 60. Thereby, the lower surface of the head section 640 defines a circumferential vial contact area 230. The stem section 220 of the stopper 20 vertically extends into the neck 630 of the vial 60. It has circumferential external rib which lies in a corresponding circumferential internal groove of the edge 640 of the vial 60. The stopper 20 and the vial 60 are abutting at the vial contact area 230 and the stopper contact area 650. In these areas a seal force F is applied which is induced by pressing the stopper 20 onto the vial 60.

The stopper 20 is held on the vial 60 by the cap 30. The cap 30 has an end side 310 contacting the top surface of the stopper 20. From the end side 310 a ring-shaped rim 320 downwardly extends which laterally or to the left and right contacts the stopper 20 and laterally is adjacent to the edge 640 of the vial 60. On its lower end the cap 30 has a crimp section 330 which extends underneath the lower side of the edge 640 projecting over the neck 630.

Figure 2:
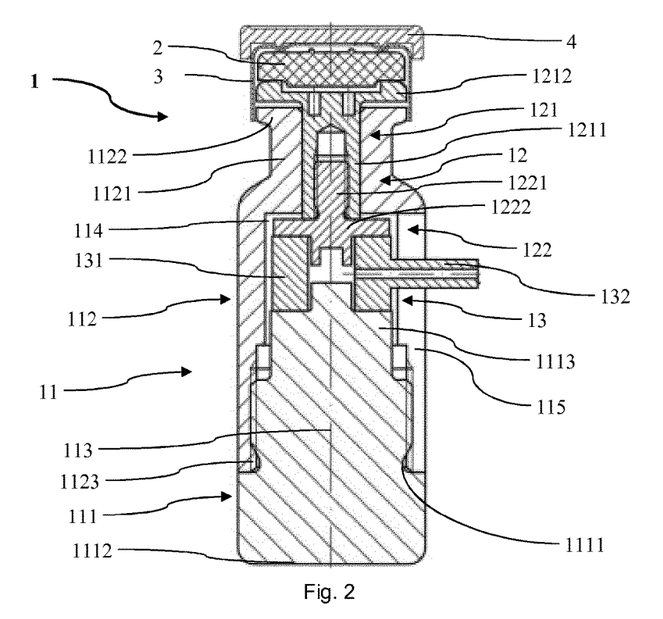
FIG. 2 shows a partial cross-sectional view of a first embodiment of a measuring apparatus according to the invention.

In FIG. 2 some pieces of a first embodiment of a measuring apparatus 1 according to the invention are shown. The measuring apparatus 1 comprises a body 11, a rigid plunger 12 and a force sensor 13. The body 11 has an interior 114 and an opening for accessing the interior 114 from outside the body 11. The body 11 is comprised of an upper part 112 and a base part 111, wherein the opening is arranged in the upper part 112. The base part 111 has a flat bottom 1112 suitable to be placed on a plane surface. The upper part 112 is connected to the base part 111 by means of a screw joint, wherein the upper part 112 comprises a male portion 1123 of the screw joint and the base part 111 a female thread 1111 of the screw joint. Thus, the base part 111 and the upper part 112 are releasably mounted to each other by means of the screw joint.

The upper part 112 of the body 11 has a neck 1121 with a central vertical bore ending in the opening on one side and in the interior 114 on the other side. Around the opening a flange 1122 is formed which is laterally projecting over the neck 1121, i.e. extending further to the left and right than the neck 1121.

The rigid plunger 12 comprises an upper head piece 121 and a lower coupling piece 122. The head piece 121 has an edge 1212 and a hollow piston portion 1211. The edge 1212 of the head piece 121 laterally projects over the neck 1121 of the upper part 112 of the body 11 and neighbours the flange 1122 of the upper part 112 of the body 11. It is arranged outside the body 11 and is equivalently shaped as an edge of an opening of a target vial, such as the vial 60 of FIG. 1. The piston portion 1211 of the head piece 121 vertically extends into the bore of the neck 1121 of the upper part 112 of the body 11 to its interior 114. Thereby, the piston portion 1211 of the through bore of the neck 1121 extends all through to its bottom end.

The coupling piece 122 of the rigid plunger 12 is arranged substantially below and under the head piece 121. It comprises an upper vertical post 1221 as piston connector and a lower flange-like sensor connector 1222. The post 1221 upwardly extends into the piston portion 1211 of the head piece 121 such that the lower end of the piston portion 1211 abuts a top surface of the sensor connector 1222. Like this, the coupling piece 122 and the head piece 121 are releasably connected to each other.

The force sensor 13 is arranged in the interior 114 of the body 11. It comprises a ring shaped piezoelectric quartz 131 as piezoelectric element and a cable port 132 extending out of the body 11 via an aperture 115 being formed in the upper part 112 of the body 11. A bottom surface of the sensor connector 1222 of the coupling piece 122 of the rigid plunger 12 abuts a top surface of the force sensor 13 in the interior 114 of the body 11. The lower part 111 of the body 11 comprises an interior seat 1113 with a stub. The piezoelectric quartz 131 of the force sensor 13 is placed on the seat 1113 of the lower part 111 of the body 11 such that the stub extends in the interior of the ring of the piezoelectric quartz 131.

The rigid plunger 12 is vertically movable relative to the body 11 and coupled to the force sensor 13. The body 11 together with the rigid plunger 12 have an outer shape essentially identical to the outer shape of the target vial. The apparatus 1 has a vertical longitudinal axis 113 along which the rigid plunger 12 is movable. The rigid plunger 12 and the base part 111 of the body 11 are rotationally symmetric around the axis 113.

On top of the edge 1212 of the rigid plunger 12 a rubber stopper 2 and a cap 3 are placed. In the status shown in FIG. 2 the rubber stopper 2 is unpressed and the cap 3 is unconnected to the rubber stopper 2 and the edge 1212. On top of the cap 3 a flip-off element 4 is placed and connectable to the cap 3. The flip-off element is arranged to be grabbed by a user and flipped-off together with the cap 3 in order to open the target vial.

Figure 3:
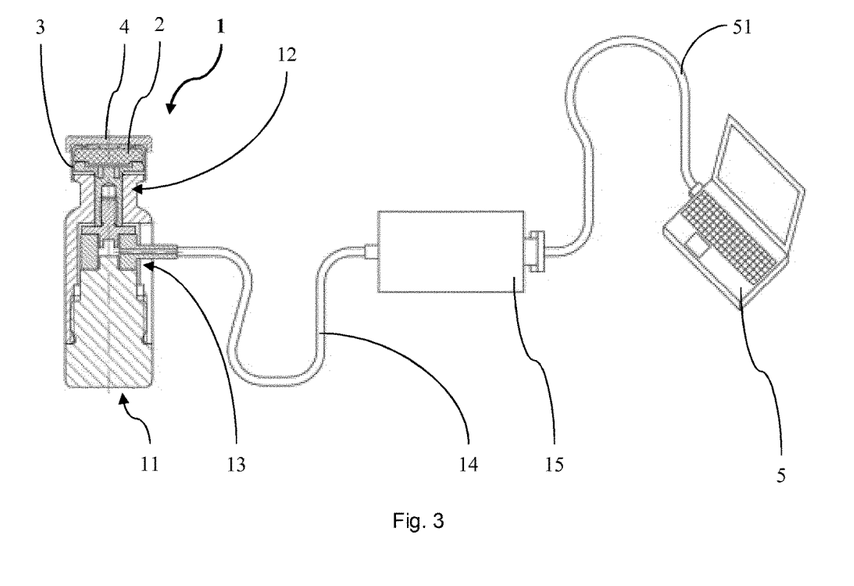
FIG. 3 shows a cross-sectional and perspective view of the measuring apparatus of FIG. 2.

As shown in FIG. 3, the cable port 132 of the force sensor 13 is connected to one end of a first wire 14 which is on its other end connected to a signal interpretation unit 15 or signal box. The signal interpretation unit 15 is situated outside the body 11. It is connected to a laptop computer 5 via a second wire 51.

By means of the for signal interpretation unit 15 a signal generated by the force sensor 13 can be evaluated, i.e. a direct current impedance can be modelled as a proportional voltage. The voltage is directly proportional to the force to acting on the force sensor 13. Thus, an output signal of the signal interpretation unit 15 is then related to the mechanical force applied to the force sensor 13 as if it had passed through the equivalent circuit. This output signal is transferred to the laptop computer 5 and further processed as the need may be, e.g., by an appropriate software executed on the laptop computer 5.

Figure 4:
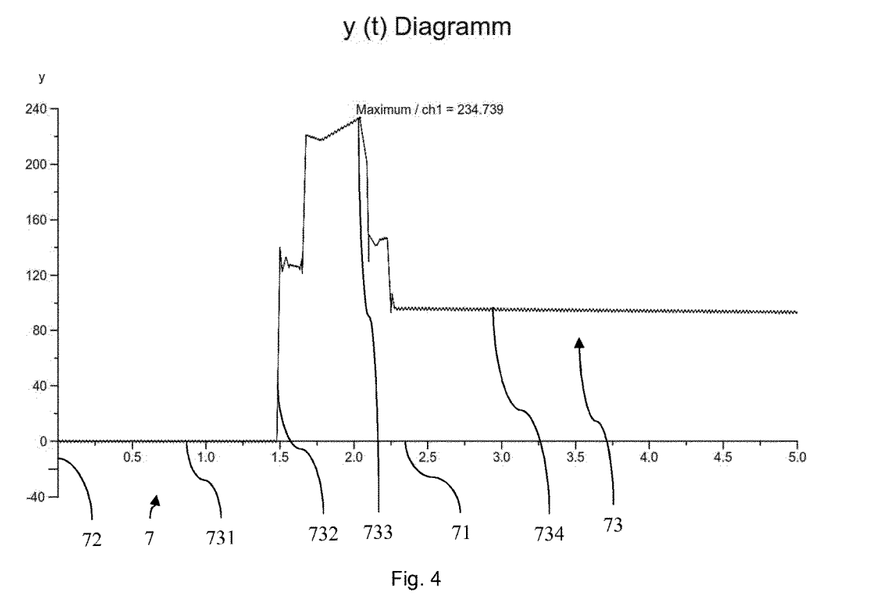
FIG. 4 shows a diagram displayed by a software evaluating measurement results of the apparatus of FIG. 2.

An example of the progress of a force measured by the apparatus 1 when being processed in a closing or packaging machine is shown in FIG. 4. The machine generally closes vials by fixing rubber stoppers on edges of openings of the vials. In particular, such fixing comprises the steps of (i) pushing the rubber stopper on the edge of the opening of the vial, (ii) placing a cap onto the rubber stopper and (iii) crimping the cap around the rubber stopper and the edge of the opening of the vial.

Turning back to FIG. 4, a section of a graphical user interface (GUI) of a dedicated software running on the laptop computer 5 is shown. The GUI displays a diagram 7 having a x-axis 71 representing a processing time in seconds and a y-axis 72 representing a measured force in Newton. In the diagram 7 a graph 73 is drawn which represents the force measured by the apparatus 1.

The graph 73 has a pre-pressure section 731 in which the apparatus 1 is placed in the machine but no pressure is applied. In this pre-pressure section 731 the measured force is zero. Beginning at about 1.5 seconds, a pressuring section 732 of the graph 73 starts. In this section the course of the measured force during compression of the rubber stopper 2 and during crimping the cap 3 can be seen. Notably, the measured force is not simply raising to a specific value being representative for the pressure applied on the rubber stopper 2 but the effects of the crimping forces also imply the measured force or seal force resulting in a more complex curve. The pressuring section 732 of the graph 73 has a maximum 733 at about 235 Newton.

The graph further has a residual force section 734 which represents the force measured after the apparatus 1 being closed or processed by the machine. The residual force section 734 starts at about 2.25 seconds. The measured seal force in the residual force section 734 is approximately stable or very slightly decreasing and is in between 80 Newton and 90 Newton.

The apparatus 1 described hereinbefore can, e.g., be used for adjusting the machine with regard to the pressure applied to vials for closing them. In particular, the following can be performed: placing the measuring apparatus 1 in the machine instead of a target vial, starting to obtain a signal provided by the force sensor 13 of the measuring apparatus 1, operating the machine to fix the rubber stopper 2 on the edge 1212 of the measuring apparatus 1, observing the signal of the force sensor 13 of the apparatus 1 during operation of the machine, evaluating the observed signal, and adjusting the machine in accordance with the evaluated signal.

The evaluation of the observed signal is performed by means of the dedicated software running on the laptop computer 5. Thereby, a maximum force corresponding to the maximum 733 of the graph 73 of the diagram 7 and a minimum force corresponding to the residual force represented by the residual force section 734 of the graph 73 are predefined. The maximum force is predefined or dimensioned such that the rubber stopper 2 and the edge 1212 are not damaged or impaired. The minimum force is predefined or dimensioned to assure that closing is tight and seal.

The machine then is adjusted such that the force measured by the apparatus 1 when being operated by the machine does not exceed the maximum force and such that a residual force measured by the apparatus 1 after being operated by the machine is not below the minimum force.

Furthermore, the apparatus 1 can be used for observing the residual force over a comparably long term for evaluating a long term behaviour of the closure of vials. Thereby, the signal of the force sensor 13 of the apparatus 1 is observed after operation of the machine and the observed signal is evaluated. For example, a decrease of the seal force can be identified which can be related to a loss of tightness of the closure.

Figure 5:
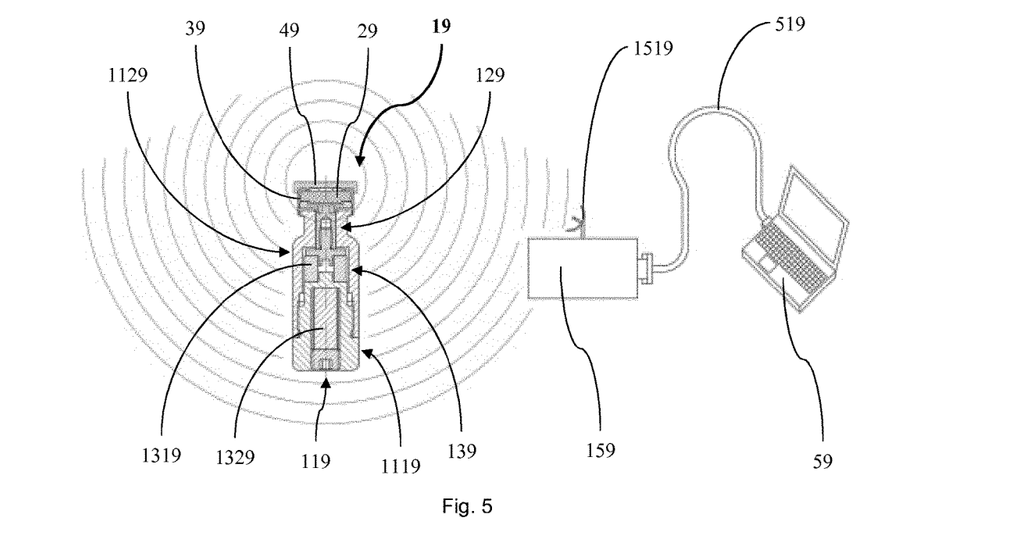
FIG. 5 shows a cross-sectional and perspective view of a second embodiment of a measuring apparatus according to the invention.

FIG. 5 shows a second embodiment of a measuring apparatus 19 according to the invention. The apparatus 19 is essentially identically embodied as the measuring apparatus 1 of FIG. 2 and FIG. 3 described hereinbefore. In particular, all parts and features shown in FIG. 2 and FIG. 3 and described in the according sections hereinbefore which are not described in the following as being different are identical.

The apparatus 19 has a body 119 with an upper part 1129 and a base part 1119, a force sensor 139, a rigid plunger 129 and a signal interpretation unit 159. On top of the rigid plunger 129 a rubber stopper 29, a cap 39 and a flip-off element 49 are placed. The signal interpretation unit 159 is connected to a laptop computer 59 by a wire 519.

The base part 1119 of the body 119 is embodied with an inner chamber in which a radio transmitter 1329 as wireless communication transmitter of the force sensor 139 is arranged. Since the force sensor 139 has the radio transmitter 1329 no cable port is required. The inner chamber of the base part 119 is closed from its bottom side by a closure screw. The signal interpretation unit 159 has a radio receiver 1519 as wireless communication receiver. The radio transmitter 1329 and the radio receiver 159 are adapted for transferring a signal from the force sensor 139 to the signal interpretation unit 159.

The upper part 129 of the apparatus 19 has a continuous side wall. In particular, contrary to the upper part 12 of the apparatus 1 of FIG. 1, it does not have an aperture. The body 119 of the apparatus is made of a material which does not impede radio communication between the force sensor 139 and the signal interpretation unit 159. It is, e.g., made of a rigid plastic material.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figures individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A measuring apparatus for measuring a force acting on an edge of an opening of a target vial comprising:
    a body with an interior and an opening for accessing the interior from outside the body;
    a rigid plunger having an edge being equivalently shaped as the edge of the opening of the target vial; and
    a force sensor, wherein the rigid plunger extends though the opening of the body into the interior of the body, the edge of the rigid plunger is arranged outside the body, the force sensor is arranged in the interior of the body, and the rigid plunger is movable relative to the body and is coupled to the force sensor.

2. The measuring apparatus according to claim 1, wherein the rigid plunger is linearly movable relative to the body.

3. The measuring apparatus according to claim 1, wherein the measuring apparatus has a height essentially identical to a height of the target vial.

4. The measuring apparatus according to claim 1, wherein the body and the rigid plunger have an outer shape being essentially identical to the outer shape of the target vial.

5. The measuring apparatus according to claim 1, wherein the force sensor comprises a piezoelectric element.

6. The measuring apparatus according to claim 1, further comprising:
    a signal interpretation unit for evaluating a signal generated by the force sensor, wherein the signal interpretation unit is arranged outside the body and connected to the force sensor.

7. The measuring apparatus according to claim 6, wherein the force sensor has a wireless communication transmitter for transmitting the signal to the signal interpretation unit and the signal interpretation unit has a wireless communication receiver for receiving the signal from the force sensor.

8. The measuring apparatus according to claim 1, wherein the rigid plunger has a head piece comprising the edge, and a piston portion extending through the opening of the body to the interior of the body.

9. The measuring apparatus according to claim 1, wherein the body has a neck with a bore ending in the opening on one side and in the interior on the other side, and a flange formed around the opening and projecting over the neck.

10. The measuring apparatus according to claim 9, wherein the edge of the head piece of the rigid plunger projects over the neck of the body and neighbours the flange of the body, and the piston portion of the head piece of the rigid plunger extends into the bore of the neck of the body to the interior of the body.

11. The measuring apparatus according to claim 10, wherein the rigid plunger comprises a coupling piece with a piston connector and a flange-like sensor connector opposing the piston connector, wherein the coupling piece is separable from the head piece, the piston connector of the coupling piece is formed to be connected to the piston portion of the head piece, the sensor connector of the coupling piece projects over the neck of the body, and the sensor connector contacts the force sensor in the interior of the body.

12. The measuring apparatus according to claim 1, wherein the body has an upper part and a base part, wherein the opening of the body is arranged in the upper part, the base part is shaped to be placed on a surface, and the upper part is separable from the base part.

13. The measuring apparatus according to claim 12, wherein the upper part of the body and the base part of the body have a thread and a male portion together forming a screw joint.

14. A method of adjusting a machine for closing a vial by fixing a rubber stopper on an edge of an opening of the vial wherein said fixing the rubber stopper on the edge of the opening of the vial comprises pushing the rubber stopper on the edge of the opening of the vial, placing a cap onto the rubber stopper and crimping the cap around the rubber stopper and the edge of the opening of the vial, the method comprising:
    placing a measuring apparatus according to claim 1 in the machine instead of the vial;
    starting to obtain a signal provided by a force sensor of the measuring apparatus;
    operating the machine to fix a rubber stopper on an edge of the measuring apparatus;
    observing the signal of the force sensor of the measuring apparatus during operation of the machine;
    evaluating the observed signal; and
    adjusting the machine in accordance with the evaluated signal.

15. The method according to claim 14, further comprising:
    predefining a maximum force and a minimum force, wherein the machine is adjusted such that a force measured by the measuring apparatus when being operated by the machine does not exceed the maximum force, and such that a residual force measured by the measuring apparatus after being operated by the machine is not below the minimum force.

16. The method according to claim 14, further comprising:
    observing the signal of the force sensor of the measuring apparatus after operation of the machine and evaluating the observed signal.

* * * * *

UNITED STATES PATENT AND TRADEMARK OFFICE
CERTIFICATE OF CORRECTION

PATENT NO. : 10,175,128 B2
APPLICATION NO. : 15/531903
DATED : January 8, 2019
INVENTOR(S) : Martin Vogt et al.

Page 1 of 1

It is certified that error appears in the above-identified patent and that said Letters Patent is hereby corrected as shown below:

Column 11, Line 14 (Claim 1): "though" should be replaced with -- through --

Signed and Sealed this
Second Day of July, 2019

Andrei Iancu
*Director of the United States Patent and Trademark Office*